United States Patent
Begon et al.

(10) Patent No.: US 7,533,241 B2
(45) Date of Patent: May 12, 2009

(54) VARIABLE SIZE CACHE MEMORY SUPPORT WITHIN AN INTEGRATED CIRCUIT

(75) Inventors: Florent Begon, Antibes (FR); Vladimir Vasekin, Cambridge (GB); Andrew Christophe Rose, Cambridge (GB); Nicolas Chaussade, Mouans-Sartoux (FR)

(73) Assignee: ARM Limited, Cambridge (GB)

( * ) Notice: Subject to any disclaimer, the term of this patent is extended or adjusted under 35 U.S.C. 154(b) by 342 days.

(21) Appl. No.: 11/634,253

(22) Filed: Dec. 6, 2006

(65) Prior Publication Data

US 2007/0150640 A1    Jun. 28, 2007

(30) Foreign Application Priority Data

Dec. 22, 2005    (GB)    ................................. 0526203.5

(51) Int. Cl.
G06F 12/08    (2006.01)
G06F 12/10    (2006.01)
(52) U.S. Cl. ...................................... 711/212; 711/207
(58) Field of Classification Search .................. 711/128, 711/118, 207, 203, 144, 145, 212, 3
See application file for complete search history.

(56) References Cited

U.S. PATENT DOCUMENTS

| | | | | | |
|---|---|---|---|---|---|
| 6,014,732 | A | * | 1/2000 | Naffziger | 711/203 |
| 6,446,187 | B1 | * | 9/2002 | Riedlinger et al. | 711/206 |
| 6,493,812 | B1 | * | 12/2002 | Lyon | 711/207 |

FOREIGN PATENT DOCUMENTS

| | | | |
|---|---|---|---|
| EP | 000911737 A1 | * | 4/1999 |
| JP | 9-97213 | | 4/1997 |
| WO | 01/61501 A1 | | 8/2001 |

OTHER PUBLICATIONS

GB Search Report of GB 0526203.5 dated Feb. 6, 2006.

* cited by examiner

*Primary Examiner*—Pierre-Michel Bataille
(74) *Attorney, Agent, or Firm*—Nixon & Vanderhye P.C.

(57) ABSTRACT

An integrated circuit 2 is provided with a cache memory 6 and a cache controller 10 coupled to the cache memory 6 via a cache memory interface 8. The cache controller supports different cache memory sizes. The cache memory 6 includes masking logic 14 responsive to cache memory size signals to form masked address values for use in accessing the cache memory 6. The cache controller 10 can be part of a processor core 4 which may be hardened in its design and yet able to cope with variable cache memory sizes since the masking logic 14 is provided within the cache memory 6 outside of the hardened periphery of the processor core 4.

16 Claims, 2 Drawing Sheets

// cache size encoding
//
// 0000 : 4kB $
// 0001 : 8kB $
// 0011 : 16kB $
// 0111 : 32kB $
// 1111 : 64kB $

Fig. 2

Tag masking logic for each way dc_tagram_rdata0 = {dc_tagram_rdata0_ram[23:4], dc_tagram_rdata0_ram[3:0] & ~d_size_mask};

Address masking for each way ddata_bank0_addr = (dc_dataram_addr0_i & {d_size_mask, 7'b1111111});

Fig. 3

VARIABLE SIZE CACHE MEMORY SUPPORT WITHIN AN INTEGRATED CIRCUIT

BACKGROUND OF THE INVENTION

1. Field of the Invention

This invention relates to the field of integrated circuits including cache memories. More particularly, this invention relates to how to deal with such integrated circuits having cache memories which have a variable size.

2. Description of the Prior Art

It is known to provide integrated circuits, such as microprocessors, with cache memories for locally storing one or more of instructions and data. The cache memory gives high speed access to the stored information. Depending upon the particular use of an integrated circuit, the requirements for the size of the cache memory can vary considerably. Providing too little cache memory can have a significant performance degrading effect, whereas providing too much cache memory needlessly increases the cost, power consumption, size etc of the integrated circuit. For these reasons it is known to provide integrated circuit designs where a manufacturer of that design can select a particular size of the cache memory to be provided depending upon the use intended for an integrated circuit.

One way of providing for such variable cache size is to include within the design, and in particular within the cache controller design, user defined parameters which specify the cache size to be provided. When that design (such as RTL code) is compiled, the appropriate controller for the cache size specified is generated. This approach suffers from the disadvantage that all possible combinations of the user defined cache size parameters require validation and this significantly increases the required validation effort and associated cost. The cache RAM integration tests should also be parameterized by the same user defined parameters and validated for all options. Finally, this approach does not make it possible to harden the core design (i.e. fix a particular compiled design that is known to be satisfactory and reuse this in other circumstances) since it will not be suited for use with different cache sizes.

Another possible approach is to provide the cache controller with suitable logic, such as masking logic, which can be configured with static configuration pins to select a particular cache size which has been implemented. One disadvantage with this approach is that the masking logic is redundant for a chosen cache size and yet needs to be provided to give the flexibility within the design. Thus, the redundant logic represents a disadvantageous overhead. In addition, the masking logic used is usually located in timing critical paths where it introduces a disadvantageous path delay. Furthermore, integration testing needs to be performed with a knowledge of the configuration pin values being used and this increases the complexity of the integration testing.

SUMMARY OF THE INVENTION

Viewed from one aspect the present invention provides an integrated circuit comprising:

a cache memory; and a cache controller coupled to said cache memory via a cache memory interface having a cache controller side and a cache memory side, said cache controller and said cache memory interface supporting operation with cache memories of different cache memory sizes connected to said cache memory side of cache memory interface; wherein said cache memory includes masking logic responsive to one or more cache memory size signals received via said cache memory interface to apply variable masking to an address value generated by said cache controller to form at least one masked address value for use in accessing said cache memory, said masking applied by said masking logic being varied in dependence upon said one or more cache memory size signals to match a cache memory size of said cache memory.

The present technique addresses the above problems by providing an integrated circuit in which the cache controller is arranged to deal with different cache memory sizes when performing its cache management tasks when operating in combination with masking logic provided within the cache memory itself. The integrated circuit design excluding the cache memory can be hardened and reused in a single form avoiding the excess validation associated with multiple forms and the masking logic required to deal with variable cache memory sizes can be located outside of the hardened design within the cache memory itself, which will in any case be modified for each cache memory design. Furthermore, when a cache memory size is eventually settled upon, the masking logic in production integrated circuits can be removed from the cache memory and accordingly will not impact timing critical paths.

It will be appreciated that the cache memory can take a variety of different forms and the masking logic can operate in a variety of different ways, but the masking logic is particularly useful in generating the tag address for a tag memory within a cache since the tag size will vary with the cache size. In a similar way, the data address for a particular data value within a cache row may be generated by the masking logic as this will again likely show variation in dependence upon the cache size.

The technique can be further enhanced in embodiments in which the cache memory passes signals to the cache controller via the cache memory interface indicating the maximum and minimum cache memory sizes that the particular cache memory concerned can be configured to provide. Thus, whilst a cache controller may be able to operate with a wide range of cache sizes, an individual cache memory being used in combination with that cache controller may only provide a single cache memory size or a narrow range of cache memory sizes.

The flexibility of the cache controller is improved in embodiments in which a software programmable register stores a cache memory size value. Thus, the integrated circuit can be software configured to select different cache memory sizes where these are possible, or to select the particular cache memory size where only one cache memory size is possible.

The hardware controlling signals for the cache controller specifying the cache memory size can be generated from this software programmable register in a convenient and efficient manner.

Clipping logic may advantageously be provided associated with the software programmable register so as to limit the values which can be programmed into that register so as to be subject to the minimum and maximum sizes as being reported by the cache memory connected at that time.

The cache memory may be a unified memory or provide separate instruction storage and data storage. The cache memory can have a variable number of cache ways, such as a four-way memory.

The cache controller is advantageously provided as part of a processor core that is validated separately from the cache memory, with that validation being independent of cache memory size.

Viewed from another aspect the present invention provides an integrated circuit comprising:

cache memory means; and cache controller means coupled to said cache memory means via a cache memory interface having a cache controller side and a cache memory side, said cache controller means and said cache memory interface supporting operation with cache memory means of different cache memory sizes connected to said cache memory side of cache memory interface; wherein said cache memory means includes masking logic means responsive to one or more cache memory size signals received via said cache memory interface to apply variable masking to an address value generated by said cache controller means to form at least one masked address value for use in accessing said cache memory means, said masking applied by said masking logic means being varied in dependence upon said one or more cache memory size signals to match a cache memory size of said cache memory means.

Viewed from a further aspect the present invention provides a method of operating an integrated circuit, said method comprising the steps of:

storing data within a cache memory;

controlling said cache memory with a cache controller coupled to said cache memory via a cache memory interface having a cache controller side and a cache memory side, said cache controller and said cache memory interface supporting operation with cache memories of different cache memory sizes connected to said cache memory side of cache memory interface; and using masking logic within said cache memory responsive to one or more cache memory size signals received via said cache memory interface to apply variable masking to an address value generated by said cache controller to form at least one masked address value for use in accessing said cache memory, said masking applied by said masking logic being varied in dependence upon said one or more cache memory size signals to match a cache memory size of said cache memory.

The above and other objects, features and advantages of this invention will be apparent from the following detailed description of illustrative embodiments which is to be read in connection with accompanying drawings.

BRIEF DESCRIPTION OF THE DRAWINGS

FIG. 2 illustrates cache size encodings which may be used with the example embodiment of FIG. 1; and FIG. 3 illustrates logical statements defining the masking functionality provided by the masking logic of the example embodiment of FIG. 1.

DESCRIPTION OF THE PREFERRED EMBODIMENTS

Figure 1:
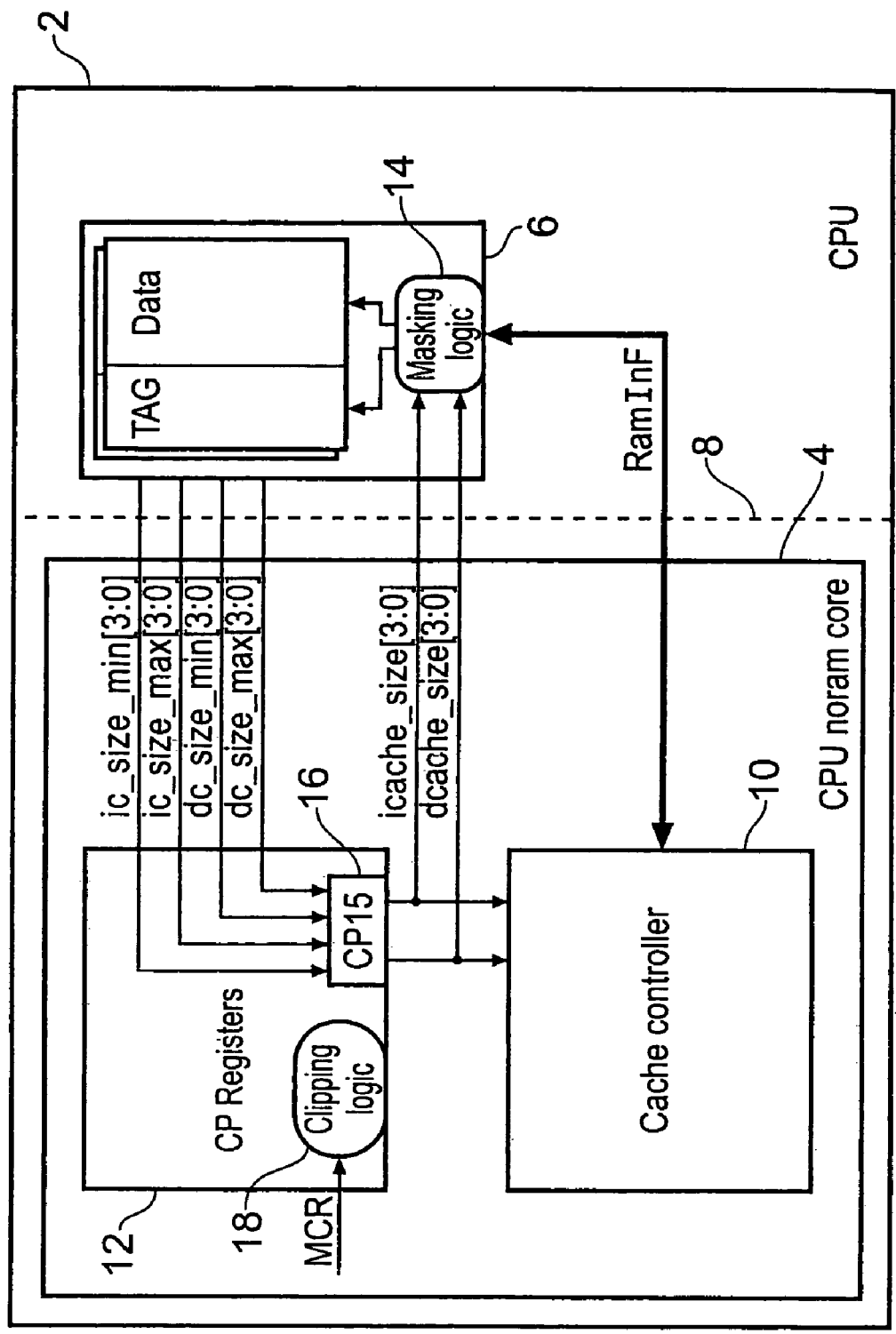
FIG. 1 schematically illustrates an integrated circuit incorporating a cache controller and a cache memory of variable cache memory size.

FIG. 1 schematically illustrates an integrated circuit 2 including a processor core 4 and a cache memory 6. A cache memory interface 8 is provided between the processor core 4 and the cache memory 6 with the signals exchanged between the processor core 4 and a cache memory 6 passing through this cache memory interface 8. The processor core 4 includes a cache controller 10 and a configuration coprocessor 12 as well as numerous other functional elements, which for the sake of clarity are not illustrated in FIG. 1, but will be well known to those skilled in this technical field.

When the processor core 4 needs to access a particular instruction or data value then the cache controller 10 uses the memory address associated with that cache access to look up in the cache memory 6 whether or not the particular data/instruction for the memory address concerned is stored within the cache memory 6. The cache memory 6 will return a hit or a miss result and dependent upon this a memory access to the main memory may be required. As will be appreciated by those in this technical field depending upon the size of the instruction cache and data cache provided within the cache memory 6, the length of the TAG used will vary. A smaller cache memory size will require a larger TAG. Thus, the bits within the memory address supplied by the cache controller 10 which need to be compared with TAG values will vary in dependence upon the cache memory size implemented. Masking logic 14 within the cache memory 6 is responsible for masking the address value supplied from the cache controller 10 to select from that address value the appropriate bits to be routed to the TAG portion of the cache memory 6 and compared with the TAG values stored therein to determine whether a hit or a miss result should be returned. In a similar way, the masking logic 14 selects some of the bits of the address supplied by the cache controller 10 and uses these to address the appropriate position within any cache row where a hit occurs in order to retrieve the data/instruction value associated with the cache access being performed. The data address portion used will again vary depending upon the cache memory size implemented.

The masking logic 14 receives a number of 4-bit signals from the processor core 4 which are read from a software programmable register 16 and which respectively specify the instruction cache size and the data cache size. The cache controller 10 is also responsive to the instruction cache memory size signal and the data cache memory size signal to generate the appropriate cache maintenance operation commands and signals, such as invalidate all, etc, which are matched to the implemented size of the cache memory 6. The software programmable register 16 also stores within different fields therein values returned from the cache memory 6 via the cache memory interface 8 indicating the maximum and minimum cache memory sizes supported for each of the instruction cache and the data cache within the cache memory 6. These maximum and minimum sizes can be read by software executing upon the processor core 4 and used for control, or other reasons. The instruction and data cache sizes to be used can be written into the software programmable register 16, which is provided within a configuration coprocessor 12 by an MCR instruction, which is an ARM instruction set instruction for moving a value to a coprocessor register. Clipping logic 18 is provided to clip the cache memory size values being written to the software programmable memory 16 so as to be subject to the minimum and maximum instruction and data cache sizes which have been specified by the particular cache memory 6 implemented. This prevents the software setting up the system to use a cache memory of a size which is not actually supported. This feature also allows the software to determine what are the maximum and minimum sizes supported by attempting to write certain values and then seeing if these have been clipped by reading back from the software programmable register 16 and determining if the values read back are different from those which were attempted. This information can be used to allow a piece of software to respond appropriately to the cache size provided upon the integrated circuit which it is executing upon.

It will be seen from FIG. 1 that the processor core 4 does not need to change its physical form in dependence upon whatever cache memory size is provided by the cache memory 6. Thus, the processor core 4 may be validated once and hardened for reuse. The masking logic 14 provided within the cache memory 6 is useful during prototyping and development phases where it may be desirable to test (possibly dynamically) different cache memory sizes to see what effect they have upon the system performance. Thus, the minimum cache memory sizes which need be provided can be empirically determined in a way that allows efficient implementations targeted to particular uses.

FIG. 2 schematically illustrates cache size encodings which may be used to represent different sizes of instruction and data cache memories provided within the cache memory 6. These values provided using an encoding which may be directly used as a mask value within the masking logic 14. This advantageously simplifies implementation.

FIG. 3 shows the masking functionality provided by the masking logic 14 in respect of TAG and data RAM masking for each cache way. Those familiar with this technical field will appreciate that the relationships given in FIG. 3 can be utilised by automated design tools and the like to generate the masking logic 14. The examples of FIG. 2 and FIG. 3 are only one example of a particular implementation of the cache size encoding and the masking logic implementation and a wide variety of different implementations can also be used in accordance with the present techniques.

Although illustrative embodiments of the invention have been described in detail herein with reference to the accompanying drawings, it is to be understood that the invention is not limited to those precise embodiments, and that various changes and modification can be effected therein by one skilled in the art without departing from the scope and spirit of the invention as defined by the appended claims.

We claim:

1. An integrated circuit comprising:
cache memory means; and
cache controller means coupled to said cache memory means via a cache memory interface having a cache controller side and a cache memory side, said cache controller means and said cache memory interface supporting operation with cache memory means of different cache memory sizes connected to said cache memory side of cache memory interface; wherein
said cache memory means includes masking logic means responsive to one or more cache memory size signals received via said cache memory interface to apply variable masking to an address value generated by said cache controller means to form at least one masked address value for use in accessing said cache memory means, said masking applied by said masking logic means being varied in dependence upon said one or more cache memory size signals to match a cache memory size of said cache memory means.

2. An integrated circuit comprising:
a cache memory; and
a cache controller coupled to said cache memory via a cache memory interface having a cache controller side and a cache memory side, said cache controller and said cache memory interface supporting operation with cache memories of different cache memory sizes connected to said cache memory side of cache memory interface; wherein
said cache memory includes masking logic responsive to one or more cache memory size signals received via said cache memory interface to apply variable masking to an address value generated by said cache controller to form at least one masked address value for use in accessing said cache memory, said masking applied by said masking logic being varied in dependence upon said one or more cache memory size signals to match a cache memory size of said cache memory.

3. An integrated circuit as claimed in claim 2, wherein said cache memory includes a tag memory and said at least one masked address value include a tag address to address said tag memory.

4. An integrated circuit as claimed in claim 3, wherein a first portion of said address value with a bit-size selected by said masking logic in dependence upon said at least one cache size signal forms said tag address.

5. An integrated circuit as claimed in claim 2, wherein said cache memory includes a data memory and said at least one masked address value includes a data address to address said data memory.

6. An integrated circuit as claimed in claim 5, wherein a second portion of said address value with a bit-size selected by said masking logic in dependence upon said at least one cache size signal forms said data address.

7. An integrated circuit as claimed in claim 2, wherein said cache memory passes via said cache memory interface limit signals representing a minimum cache memory size and a maximum cache memory size with which said cache memory can be configured to operate.

8. An integrated circuit as claimed in claim 2, comprising a software programmable register storing a cache memory size value.

9. An integrated circuit as claimed in claim 8, wherein said cache controller reads said cache memory size value from said software programmable register as a parameter controlling cache management operations performed by said cache controller upon said cache memory.

10. An integrated circuit as claimed in claim 8, wherein said at least one cache memory size signal is generated from said cache memory size value stored in said software programmable register.

11. An integrated circuit as claimed in claim 7, comprising clipping logic responsive to said limit signals to clip a cache memory size value being written to said software programmable register so as to be subject to said minimum cache memory size and said maximum cache memory size.

12. An integrated circuit as claimed in claim 8, wherein said software programmable register is a register within a configuration coprocessor.

13. An integrated circuit as claimed in claim 2, wherein said cache memory includes an instruction cache memory and a data cache memory with respective cache memory size signals.

14. An integrated circuit as claimed in claim 2, wherein said cache controller is part of a processor core that is validated separately from said cache memory.

15. An integrated circuit as claimed in claim 14, wherein validation of said processor core is independent of said cache memory size.

16. A method of operating an integrated circuit, said method comprising the steps of:
storing data within a cache memory;
controlling said cache memory with a cache controller coupled to said cache memory via a cache memory interface having a cache controller side and a cache memory side, said cache controller and said cache memory interface supporting operation with cache memories of different cache memory sizes connected to said cache memory side of cache memory interface; and using masking logic within said cache memory responsive to one or more cache memory size signals received via said cache memory interface to apply variable masking to an address value generated by said cache controller to form at least one masked address value for use in accessing said cache memory, said masking applied by said masking logic being varied in dependence upon said one or more cache memory size signals to match a cache memory size of said cache memory.

* * * * *